(12) United States Patent
Moratalla

(10) Patent No.: US 7,373,786 B2
(45) Date of Patent: May 20, 2008

(54) DESICCANT DEHUMIDIFICATION SYSTEM

(76) Inventor: Jose Moratalla, 738 Heathrow La., Palm Harbor, FL (US) 34683

(*) Notice: Subject to any disclaimer, the term of this patent is extended or adjusted under 35 U.S.C. 154(b) by 394 days.

(21) Appl. No.: 10/517,967

(22) PCT Filed: Feb. 6, 2003

(86) PCT No.: PCT/US03/03729

§ 371 (c)(1),
(2), (4) Date: Dec. 14, 2004

(87) PCT Pub. No.: WO03/067156

PCT Pub. Date: Aug. 14, 2003

(65) Prior Publication Data

US 2006/0162366 A1 Jul. 27, 2006

(51) Int. Cl.
*F25D 23/00* (2006.01)
(52) U.S. Cl. ............................ 62/271; 165/8
(58) Field of Classification Search .......... 62/271, 62/94, 93; 165/8, 9; 236/49.3
See application file for complete search history.

(56) References Cited

U.S. PATENT DOCUMENTS

| | | | | |
|---|---|---|---|---|
| 3,279,209 A | * | 10/1966 | Laing | 62/426 |
| 3,783,637 A | * | 1/1974 | Woods | 62/427 |
| 4,067,204 A | * | 1/1978 | Riello | 62/262 |
| 4,102,148 A | * | 7/1978 | Matthews et al. | 62/77 |
| 6,134,904 A | * | 10/2000 | Jianxing | 62/296 |
| 6,511,287 B2 | * | 1/2003 | Kim | 415/204 |
| 6,692,223 B2 | * | 2/2004 | Ikeda et al. | 415/53.1 |
| 6,782,707 B2 | * | 8/2004 | Shindo et al. | 62/264 |
| 2003/0167786 A1 | * | 9/2003 | Nakagawa et al. | 62/285 |

OTHER PUBLICATIONS

Faye C. Mc. Quiston et al. "Heating, Ventilating, and Air Conditioning Analysis and Design", Fourth Edition, John Wiley & Sons, Inc. ISBN 0-471-58107-0.*

* cited by examiner

*Primary Examiner*—William E. Tapolcai

(57) ABSTRACT

A desiccant dehumification system uses an air heater incorporating air feedback from the exhaust and/or the return air fans. The air and gas are mixed in a single step, two step, or continuous modulation mixing valve. An outdoor cooking grill style burner allows a small unit to be made with tight air heating system. One system cools the return air making it cool and humid. A portion of this air is then dried by a desiccant dehumidification system which makes hot and dry output air. The remaining return air is then dried by desiccant dehumidification system output air to deliver processed air in a controlled comfort range. A second system mixes return air with fresh air making mixed return air which is dried in a desiccant dehumidification system and then cooled to a desired comfort range without condensation.

2 Claims, 3 Drawing Sheets

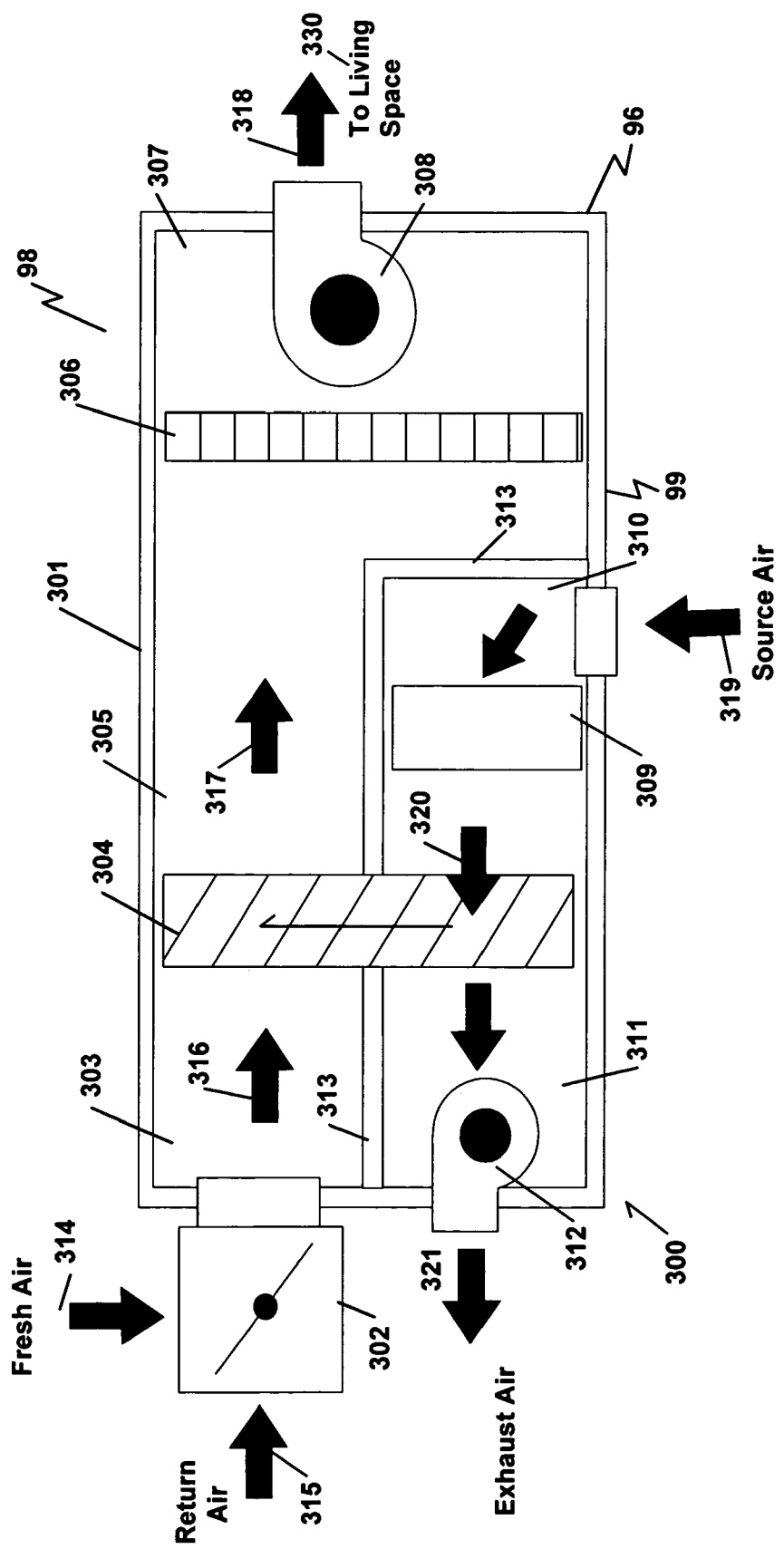

DESICCANT DEHUMIDIFICATION SYSTEM

RELATED APPLICATION

This application is based upon International Application Number PCT/US03/03729 filed 6 Feb. 2003 entitled Desiccant Dehumidification System the priority of which is claimed, the subject matter of which is incorporated herein and made a part hereof by reference.

BACKGROUND OF THE INVENTION

1. Field of the Invention

It has always been a desire to manipulate atmospheric conditions for comfort and to meet specific conditions required for certain facilities. Typically, these prior art systems have directly heated or cooled the outside air or air return from a structure and then exhausted the air into the structure. One of the effects of heating or cooling an air stream is the resulting change in the moisture content of the air. It is well recognized that the comfort of a structure is not only dependent on the temperature of the atmosphere but also on the humidity level. It is also desired to maintain specific temperature and/or humidity levels in structures.

There is a need for an economical and efficient system that can treat air to achieve a determined zone of humidity and temperature within a structure and/or within a zone of a structure. The present invention provides a system for conditioning air that meets these demands in an economical and efficient manner.

2. Description of the Prior Art

The use of systems for conditioning air of known design and configurations is known in the prior art. More specifically, systems for conditioning air of known design and configurations previously devised and utilized for the purpose of conditioning air are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,826,434 to Belding discloses a high efficiency outdoor air conditioning system. U.S. Pat. No. 6,199,388 to Fischer discloses a system and method for controlling temperature and humidity. U.S. Pat. No. 6,003,327 to Belding discloses a method and apparatus for cooling warm moisture-laden air. U.S. Pat. No. 5,667,560 to Dunne discloses a process and apparatus for dehumidification and VOC odor remediation. U.S. Pat. No. 5,649,428 to Calton et al. discloses a hybrid air-conditioning system with improved recovery evaporator and subcool condenser. Lastly, U.S. Pat. No. 5,632,954 to Coellner et al. discloses a method for killing microorganisms.

While these devices fulfill their respective, particular objectives and requirements, the aforementioned patents do not describe a desiccant dehumidification system that allows removing humidity from the air while maintaining a desired comfort factor corresponding to a desired combination of temperature and humidity.

In this respect, the desiccant dehumidification system according to the present invention substantially departs from the conventional concepts and designs of the prior art, and in doing so provides an apparatus primarily developed for the purpose of removing humidity from the air while maintaining a desired comfort factor corresponding to a desired combination of temperature and humidity.

Therefore, it can be appreciated that there exists a continuing need for a new and improved desiccant dehumidification system which can be used for removing humidity from the air while maintaining a desired comfort factor corresponding to a desired combination of temperature and humidity In this regard, the present invention substantially fulfills this need.

SUMMARY OF THE INVENTION

A desiccant dehumidification system of the type for reducing the moisture content of a stream of air to be exhausted to an area is provided. The desiccant dehumidification system includes a housing partitioned into a first and a second air chamber for passing air there through. A desiccant wheel is rotatably positioned across both air chambers in a manner such that moisture is removed from the air stream in the first chamber and moisture is removed from the desiccant wheel by an air stream in the second chamber. The second chamber further includes an air heater positioned to heat the air stream before passing across the desiccant wheel to remove moisture therefrom. The air heater is charged with a slip stream, or portion of the air stream, passing through the first air chamber and/or the second air chamber.

The air heater may be a fuel burner wherein the heater may be further controlled by the introduction of air from the first air chamber and/or the second air chamber. Utilization of a portion of air energized within one or both of the air chambers increases the efficiency of the present invention reducing energy costs and increasing energy conservation.

The present invention may further include a mixing of return air from a structure and fresh air. The system of the present invention may further include cooling and/or heating mechanisms upstream of the dehumification station or after the dehumidification station.

The system of the present invention may be utilized as a stand alone system for conditioning of air or in conjunction with current air conditioning systems to further control the desired conditions of an atmosphere.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved desiccant dehumidification system which has all of the advantages of the prior art systems for conditioning air of known design and configurations and none of the disadvantages.

It is another object of the present invention to provide a new and improved desiccant dehumidification system which may be easily and efficiently manufactured and marketed.

It is a further object of the present invention to provide a new and improved desiccant dehumidification system which is of durable and reliable constructions.

An even further object of the present invention is to provide a new and improved desiccant dehumidification system which is susceptible of a low cost of manufacture with regard to both materials and labor, and which accordingly is then susceptible of low prices of sale to the consuming public, thereby making such desiccant dehumidification system economically available to the buying public.

Even still another object of the present invention is to provide a desiccant dehumidification system for removing humidity from the air while maintaining a desired comfort factor corresponding to a desired combination of temperature and humidity.

Lastly, it is an object of the present invention to provide a new and improved desiccant dehumification system using an air heater that incorporates air feedback from the exhaust and/or the return air fans. The air and gas are mixed in a mixing valve. The mixing valve may be a single step, a two step or a continuous modulation valve. An outdoor cooking grille style burner allows a small unit to be made with tight air heating controls. The desiccant dehumidification system is combined into two desiccant air conditioning systems. One system cools the return air making it cool and humid. A portion of this air is then dried by a desiccant dehumidification system which makes output air that is hot and dry. The remaining return air is mixed with the desiccant dehumidification system output air to deliver processed air in a controlled comfort range. A second system mixed return air with fresh air to make mixed return air which is dried in a desiccant dehumidification system. The dried return air is then cooled to a desired comfort range without condensation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a block diagram of a DACS according to an embodiment of the present invention where fresh air is mixed with return air to generate air that is further conditioned to create air for a living space.

The same reference numerals refer to the same parts throughout the various Figures.

DESCRIPTION OF THE PREFERRED EMBODIMENT

Figure 1:
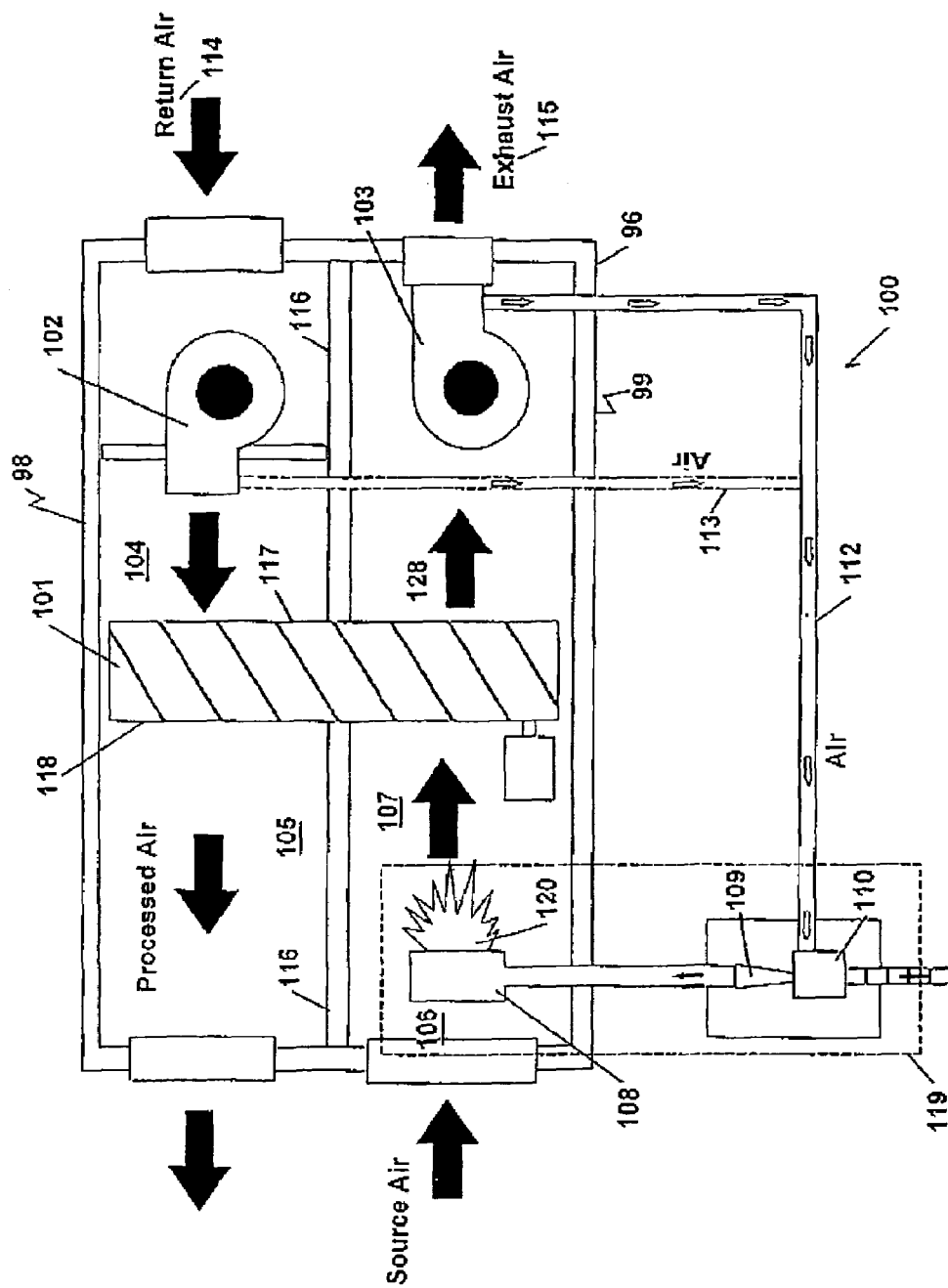
FIG. 1 is a block diagram of a desiccant dehumidification system (DDS) according to an embodiment of the present invention.

In the following description, numerous specific details are set forth to provide a thorough understanding of the present invention. However, it will be obvious to those skilled in the art that the present invention may be practiced without such specific details. In other instances, well-known mechanical subsystems have been shown in block diagram form in order not to obscure the present invention in unnecessary detail. For the most part, details concerning particular fan types, motors, valves and the like may have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements may be designated by the same reference numeral throughout the several drawings.

FIG. 1 is a block diagram of a desiccant dehumidification system (DDS) 100 according to one embodiment of the present invention. DDS 100 includes a housing 96 partitioned into two separate chambers, a first air chamber 98 and a second air chamber 99, by partition 116. This ensures that the air in each partition are relatively separate during processing. Desiccant wheel 101 is rotated so that its surfaces 117 and 118 are exposed to the air in one or the other of the partitions determined by partition 116. Desiccant wheel 101 is a porous structure and is has contained therein a desiccant material that absorbs water from air passing over it.

Processed air 105 is delivered to some space, e.g., a living space, with an air condition depending on its use. Return air 114 is air that has been exposed to the environment of the living space and is being returned to DDS 100 to be re-conditioned. Fan 102 pulls in return air 114 and forces it as pressurized return air 104 through desiccant wheel 101 from surface 117 to surface 118 where it exits as processed air 105. During this process, desiccant wheel 101 takes moisture out of pressurized return air 104. As moisture is taken from pressurized return air 104, its temperature rises and its relative humidity drops (energy is removed from the air). Processed air 105 has less humidity and a higher temperature than pressurized return air 104.

Source air 106 is air that is separate from return air 114, and processed air 105, for example it may be outside environment air. Fan 103 creates a pressure drop across the lower half of desiccant wheel 101 in the partition of DDS 100 below partition 116. Air beater 119 comprises a burner 105 with a gas (combustible) inlet line 111 and a gas/air mixing unit 110. The gas in gas line 111 is pressurized and is mixed with air from air line 112. The mixing may be done two ways. Mixing unit 110 may be simply a chamber that uses the action of venturi 109 to "pull" air from air line 112. Alternatively, mixing unit 110 may comprise a controllable mixing valve, not shown. If mixing line 111 comprises a mixing valve it may be a single step, a two step or a continuous modulation valve. Burner 108 has an igniter, not shown, for lighting the gas/air mixture from mixing unit 110 as it exits the orifices of the burner creating flame 120. Burner 108 may be designed to operate like a burner for an outdoor cooking grill.

Source air 106 is heated and becomes heated source air 107 as it passes through burner 108. Heated source air 107 passes through the portion of desiccant wheel 101 that has absorbed water from the return air 104. The heated source air 107 picks up moisture from desiccant wheel 101 creating exhaust air 128 (cooler and wetter than heated source air 107) which fan 103 delivers as exhaust air 115. The portion of desiccant wheel 101 that has had moisture removed by heated source air 107 returns to the return air stream hotter and dryer to again pick up moisture from return air 104.

Fan 102 may have a portion of its return air 104 channeled with air line 113 back to air line 112 which may alternatively receive air from exhaust air 115 via fan 103. Further burner 108 to operate, the gas in gas line 111 must be mixed with air to enable combustion to take place. The system 100 super charges the air stream for combustion by combining a portion of the pressurized return air 104 and/or pressurized exhaust air 115. If more volume of processed air 105 is required, then naturally burner 108 would have to be turned up along with increasing the speeds of fans 102 and 103. The air volume for burner 108 from line 112 would likewise increase resulting in regulation of burner 108.

Figure 2:
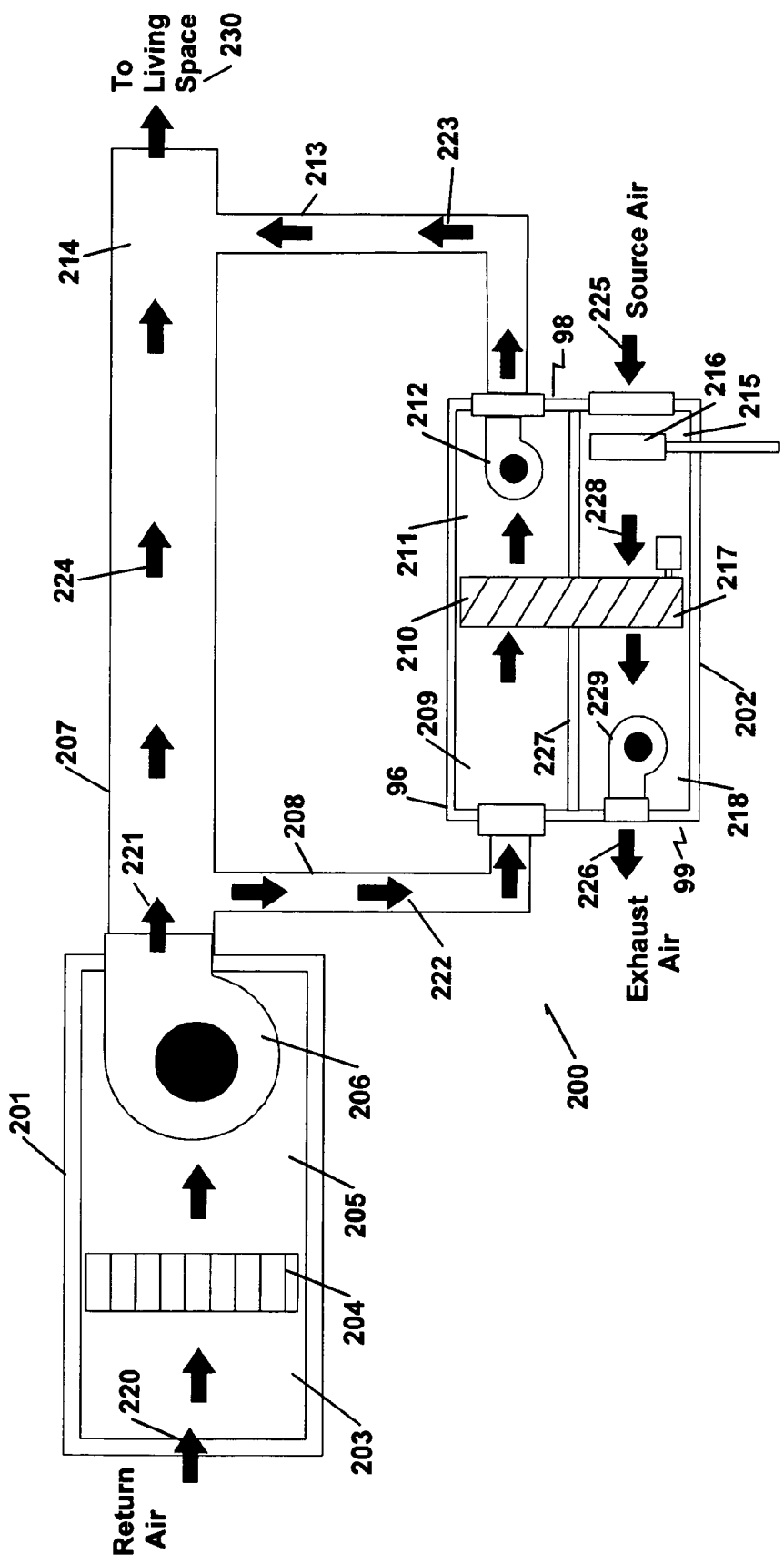
FIG. 2 is a block diagram of a desiccant air conditioning system (DACS) according to an embodiment of the present invention where return air is mixed with conditioned air to create air for a living space.

FIG. 2 is a diagram of a desiccant air conditioning system (DACS) 200 that operates according to another embodiment of the present invention. DACS 200 has three major sections; return air cooler 201, desiccant dehumidifying system (DDS) 202, and air delivery duct 207.

Return air cooler 201 has a chamber 203 and a chamber 205 separated by a cooling heat exchanger 204. Fan 206 is coupled to air delivery duct 207 and pulls air from the return air 220 and pressurizes it and delivers it to air delivery duct 207 as pressurized return air 221. DDS 202 is coupled to air delivery duct 207 with duct 28 and duct 213. A portion of pressurized return air 221 is channeled through duct 208 as the input air 22 to DDS 202. DDS 202 operates the same as DDS 202 described relive to FIG. 1. Desiccant wheel 210 rotates between the partitions of DDS 202 determined by partition 227. The upper partition is further divided by desiccant wheel 210 into chambers 209 and 211. Fan 212 pulls input air 222 into chamber 209 across desiccant wheel 210 that removes moisture and raises the temperature of output air 223. Output air 223 is delivered back to air delivery duct 207 where it is mixed with air 224 to form processed air 214 for the living space 230.

Source air 225 is heated by air heater 216 in chamber 215. Heated air 228 passes through desiccant wheel 210 where it picks up moisture that desiccant wheel 210 extracted from input air 222. This humid air exits from chamber 218 as exhaust air 226.

Return air conditioner 201 takes return air 220 which is warm with a certain relative humidity and delivers pressurized return air 221 which is cooler with a higher relative humidity. DDS 202 then dries a portion of pressurized return air 221 (input air 222) and delivers it as output air 223 which is warm dry air. The remaining air 224 (cool and with high relative humidity) is mixed with output air 223 (hot and warm) to deliver processed air 214 which is warmer and dry and is within a desired comfort zone. A controller (not shown) receives the temperature and relative humidity of processed air 214, return air 220, and output air 223 to adjust parameters of DACS 200 (e.g., fan 212 speed, heater 216 temperature, fan 229 speed, fan 206 speed, etc.) to control the temperature and humidity for the processed air 214. Processed air 214 is delivered at a comfort level using less energy than is possible with a standard air condition system.

FIG. 3 is another hybrid desiccant air conditioning system (HDACS) 300 according to embodiments of the present invention. HDACS 300 has two primary sections, air mixing chamber 302 and desiccant air conditioning system (DACS) 301. Mixing chamber 302 receives return air 315 and fresh air 314 and mixes them to form mixed air 316 which is delivered to chamber 303 in DACS 301. Partition 313 separates DACS 301 into a desiccant dryer section with chambers 310, 311, 303 and 305 and cooling section with shared chamber 305 and chamber 307. Desiccant wheel 304 operates across partition 313 that separates the return air stream from the source/exhaust air stream. Fan 308 is the air mover for the section above partition 313.

Air mixing chamber 302 allows a measured portion of outside fresh air 314 to be mixed with the return air 315 to control the air exchange rate for the living space 330. Fan 308 pulls mixed air 316 through desiccant wheel 304 which extracts moisture delivering input air 317 which is hotter and dryer than mixed air 316. Exhaust fan 312 pulls source air 319 into chamber 310 where it is heated with air heater system 309 delivering output air 320 which is hot and of low relative humidity. Output air 320 is pulled through desiccant wheel 304 where it extracts moisture from the desiccant and exits into chamber 311. The air in chamber 311 is removed by fan 312 as exhaust air 320. Exhaust air 321 is cooler and more humid than output air 320.

Mixed air 316 undergoes a desiccant drying cycle which removes energy from the air and delivers output air 317 which is hotter and dryer. Output air 317 is then pulled through cooling heat exchanger 306 which simply cools out air 317 and delivers it to chamber 307. The air from chamber 307 is then delivered to living space 330 as processed air 318. The cooling of output air 317 decreases the temperature of the air and increases its relive humidity. The air processing cycle achieved with HDACS 300 uses less energy than conventional air conditioning systems and results in a system having no or low condensation. Air heater system 309 may operate the same as air heater system 119 as described relative to FIG. 1. If air system 309 uses a burner like burner 108, then air feedback could be coupled from fan 308 and 312 with corresponding air lines (e.g. like 113 and 112 respectively)

U.S. Pat. No. 5,373,704 to McFadden may also provide exemplary procedural and/or other details supplementary to the above disclosure, and is specifically incorporated herein by reference.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A desiccant dehumidification system comprising:
a housing partitioned into a first and second air chamber each for passing air therethrough, each said air chamber having an inlet for intake of air and an outlet for exhausting air;
a rotating desiccant wheel positioned inside said housing and across said air chambers;

an air transmitting means positioned within said first air chamber for drawings return air from a structure into said first air chamber and passing said air across said desiccant wheel to remove moisture from said return air and exhausting into the structure as conditioned air;

an air transmitting means positioned within said second air chamber for drawing a source air into said second air chamber, across said desiccant wheel to remove moisture from said desiccant wheel and exhausting from said second air chamber;

an air heating means positioned in said second air chamber upstream of said desiccant wheel for heating said source air to be passed over said desiccant wheel; and a conduit being operationally connectable between said air transmitting means in said first air chamber and said air heating means for passing pressurized return air to said air heating means, said conduit also being operationally connectable between said air transmitting means in said second air chamber and said air heating means for passing pressurized source air to said air heating means.

2. A desiccant air cooling system, said desiccant air cooling system comprising:

an air mixing means having a first inlet for return air and a second inlet for fresh air, the air mixing means adapted to mix a return air from a structure with a fresh air to form a mixed air;

a housing partitioned into a first and second air chamber each for passing air therethrough, each said air chamber having an inlet for intake of air and an outlet for exhausting of air;

a rotating desiccant wheel positioned inside said housing and across said air chambers;

a cooling means positioned within said first air chamber downstream of said desiccant wheel;

an air transmitting means positioned within said first air chamber for drawing said mixed air from said air mixing means into said first air chamber and passing said mixed air along a first path of travel across said desiccant wheel to remove moisture from said mixed air, across said cooling means and exhausting into the structure as conditioned air;

an air transmitting means positioned within said second air chamber for drawing a source air into said second air chamber along a second path of travel, across said desiccant wheel to remove moisture from said desiccant wheel and exhausting from said second air chamber; and an air heating means positioned in said second air chamber upstream of said desiccant wheel for heating said source air to be passed over said desiccant wheel.

* * * * *